(12) United States Patent
Morgan et al.

(10) Patent No.: US 8,163,053 B2
(45) Date of Patent: Apr. 24, 2012

(54) HOUSING ASSEMBLY WITH BAGGING RING

(75) Inventors: Lee Pendleton Morgan, Jonesboro, AR (US); Gene E. Pierce, Jonesboro, AR (US); Michael C. Walters, Jonesboro, AR (US)

(73) Assignee: Camfil Farr, Inc., Riverdale, NJ (US)

( * ) Notice: Subject to any disclaimer, the term of this patent is extended or adjusted under 35 U.S.C. 154(b) by 0 days.

(21) Appl. No.: 13/197,222

(22) Filed: Aug. 3, 2011

(65) Prior Publication Data
US 2011/0289893 A1  Dec. 1, 2011

Related U.S. Application Data

(63) Continuation of application No. 11/240,191, filed on Sep. 30, 2005, now Pat. No. 8,002,867.

(51) Int. Cl.
*B01D 45/00* (2006.01)

(52) U.S. Cl. ............. 55/478; 55/373; 55/385.1; 55/428; 55/501; 55/DIG. 2; 96/136; 96/139; 96/224; 96/415; 96/421

(58) Field of Classification Search .............. 55/373, 55/385.1, 385.2, 422, 428–429, 432, 467, 55/478, 481, 491–492, 497, 501–502, 506, 55/DIG. 2, DIG. 20, DIG. 9; 96/136, 138, 96/139, 224, 415, 417, 421; 383/33–34.1, 383/200–211, 42–99, 905–906; 206/527
See application file for complete search history.

(56) References Cited

U.S. PATENT DOCUMENTS

| | | | |
|---|---|---|---|
| 3,261,148 A | 7/1966 | Wurtenberg | |
| 3,354,616 A | 11/1967 | Lucas | |
| 3,402,530 A | 9/1968 | Agnon | |
| 4,334,896 A | 6/1982 | Muller | |
| 4,450,964 A | 5/1984 | Wood | |
| 4,769,052 A | 9/1988 | Kowalski | |
| 5,290,441 A | 3/1994 | Griffin et al. | |
| 5,306,264 A | 4/1994 | Ferguson et al. | |
| 5,591,338 A | 1/1997 | Pruette et al. | |
| 5,800,415 A | 9/1998 | Olsen | |
| 5,837,040 A | 11/1998 | Caughron et al. | |
| 6,045,599 A | 4/2000 | Solberg, Jr. | |

(Continued)

FOREIGN PATENT DOCUMENTS
EP  0045696 A1  2/1982
(Continued)

OTHER PUBLICATIONS

Pharmaseal®, Product sheet 3420-0303, Camfil Farr, Inc. Washington NC, Camfil Farr, date unknown.

(Continued)

*Primary Examiner* — Jason M Greene
*Assistant Examiner* — Karla Hawkins
(74) *Attorney, Agent, or Firm* — Patterson & Sheridan, LLP

(57) ABSTRACT

Embodiments of the invention generally include a filter housing having a bagging ring coated to enhance a bag-to-bagging ring seal. In one embodiment, the housing assembly includes a housing having an inlet, an outlet and an access port. A bagging ring is disposed around the access port and includes a material having a property that enhances the bag-to-bagging ring seal. Examples of materials that have a property that enhance the bag-to-bagging ring seal include materials that are attracted to a plastic bag, materials that are tacky, materials that have a static attraction to a plastic bag.

20 Claims, 2 Drawing Sheets

U.S. PATENT DOCUMENTS

| | | | |
|---|---|---|---|
| 6,149,699 | A | 11/2000 | Grantham |
| 2002/0021844 | A1 | 2/2002 | Rusert et al. |
| 2002/0166449 | A1 | 11/2002 | Scanlon |

FOREIGN PATENT DOCUMENTS

| | | | |
|---|---|---|---|
| EP | 1034830 | A2 | 9/2000 |
| FR | 2338735 | A1 | 8/1977 |
| JP | 07191189 | A | 7/1995 |

OTHER PUBLICATIONS

International Search Report and Written Opinion for PCT/US06/38439, consists of 9 unnumbered pages.

European Search Report and Written Opinion of PCT/US2006038439, dated Oct. 2, 2009.

Official Letter dated Jan. 24, 2012, from European Patent Office for corresponding European Patent Application No. 06 816 020.9-2113.

HOUSING ASSEMBLY WITH BAGGING RING

CROSS-REFERENCE TO RELATED APPLICATION(S)

This application is a continuation application of U.S. patent application Ser. No. 11/240,191, filed Sep. 30, 2005, now U.S. Pat. No. 8,002,867 entitled "HOUSING ASSEMBLY WITH BAGGING RING", herein incorporated by reference.

BACKGROUND OF THE INVENTION

1. Field of the Invention

The present invention generally relates to a housing assembly having a bagging ring, and more specifically, a housing assembly for an air filter having a ring for bag-in/bag-out filter replacement.

2. Description of the Related Art

Contamination housing assemblies are used in critical processes where hazardous airborne materials must be prevented from escaping to the atmosphere. A filter is disposed in the contamination housing assembly to remove the hazardous and other materials from the air stream passing though the housing assembly. The housing assembly may be configured to include at least one filter, such as a particulate filter, such as a HEPA filter, and/or molecular filters for absorbing molecular contaminants.

The filters disposed in the contamination housing assembly are periodically replaced using a control barrier to protect change-out personnel from contaminants within the housing and from contaminants captured by the filters. The typical control barrier utilized is a plastic bag enclosure system such as described in U.S. Pat. No. 3,354,616, issued Nov. 28, 1967. The use of a plastic bag to remove and replace filters from a contamination housing assembly is typically known as a bag-in/bag-out procedure.

In a bag-in/bag-out filter change-out, a plastic bag is coupled to a bagging ring extending from the housing assembly and circumscribing an access port. The filter is drawn into the bag as it is removed from the housing. The bag is then sealed and cut between the filter and the housing, thus isolating the filter without exposing the interior of the contamination housing to the surrounding environment.

A second bag having a new filter disposed therein is secured to the bagging ring without removing the sealed bag. The sealed bag is then cut and/or removed to allow the new filter to pass into the housing while the second bag maintains a contamination barrier over the access port. The filter is sealing engaged to the housing. The access port is then sealed over the second bag and the contamination housing assembly is ready for operation.

Although conventional bagging rings utilized to attach filter change-out bags to contamination housings have robustly enabled contamination housings to be utilized in a variety of hazardous environments, the critical nature of the bag-to-housing seal, along with the increasing severity of the biomedical, radiological and carcinogenic contaminants present in these systems, improvements to the integrity of the bag-to-bagging ring seal is highly desirable.

Thus, there is a need for a housing having an improved bag to bagging ring seal.

SUMMARY OF THE INVENTION

Embodiments of the invention generally include a filter housing having a bagging ring coated to enhance a bag-to-bagging ring seal. In one embodiment, the housing assembly includes a housing having an inlet, an outlet and an access port. A bagging ring is disposed around the access port and includes a material having a property that enhances the bag-to-bagging ring seal. Examples of materials that have a property that enhance the bag-to-bagging ring seal include materials that are attracted to a plastic bag, materials that are tacky, materials that have a static attraction to a plastic bag.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
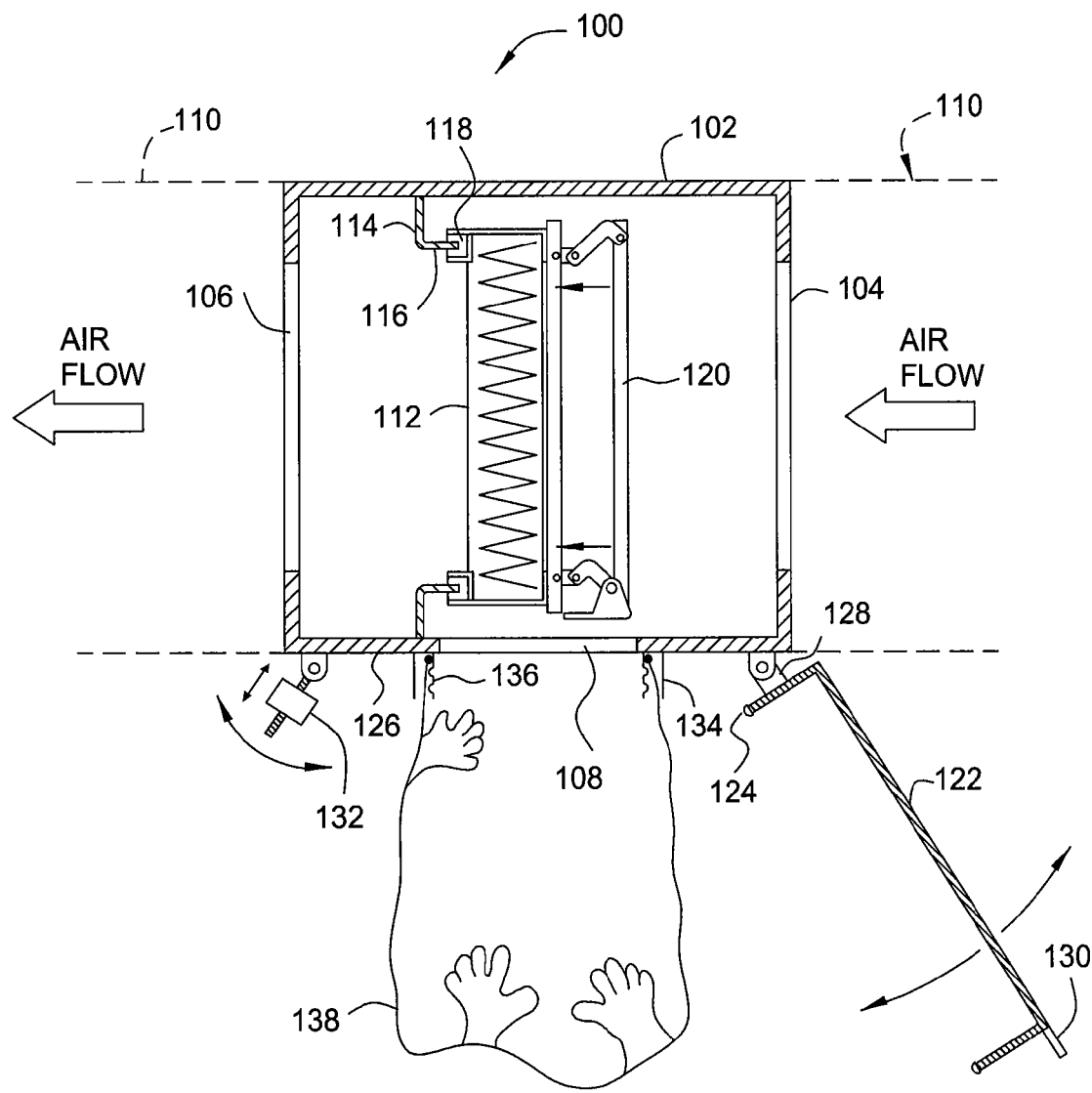
FIG. 1 is a cross-sectional view of one embodiment of a contamination housing.

FIG. 1 is a sectional view of one embodiment of a contamination housing assembly 100. The housing assembly 100 generally includes a housing 102 having an inlet 104, an outlet 106 and an access port 108. The inlet 104 and outlet 106 are formed through the housing 102 and allow gases flowing through a duct 110, shown in phantom in FIG. 1, to pass through the housing 102. The access port 108 is configured to permit access to the interior of the housing 102, for example, for filter change-out, scanning a filter disposed in an adjacently coupled housing, and the like.

The housing 102 may be fabricated from a metal, such as aluminum, steel and stainless steel, or other suitable material. The housing 102 has a construction that forms a pressure barrier between gases flowing therethrough and an environment outside the housing 102. In the embodiment depicted in FIG. 1, the housing 102 is a hollow rectangular body fabricated from continuously welded metal sheets.

The housing 102 additionally includes an internal flange 114 that sealingly engages a filter 112 disposed in the housing assembly 100. In the embodiment depicted in FIG. 1, the flange 114 includes a knife edge 116 that sealingly engages a fluid seal 118 disposed in a frame of the filter 112. The seal between the housing 102 the filter 112 forces air traveling through the housing 102 to pass through the filter 112. A linkage mechanism 120 is provided in the housing 102 and is configured to move the filter 112 between a position sealingly engaged with the flange 114 and a position clear of the flange 114.

The access port 108 is configured to facilitate removal of the filter 112 from the housing 102 and is selectively sealed by a door 122. The door 122 is coupled to the housing 102 by a hinge 128. The door 122 includes a seal 124 that engages a face 126 of the housing 102 when the door 122 is in a closed position, thus sealing the access port 108.

A clamp 132 is provided to secure the door 122 when in a closed position. In the embodiment depicted in FIG. 1, the clamp 132 is a knob disposed on a threaded stud. The clamp 132 is adapted to selective engage a locking tab 130 extending from the door 122. With the door 122 in the closed position, the knob of the clamp 132 may be positioned to engage a locking tab 130 extending from the door 122, such that the seal 124 may be compressed against the face 126 of the housing 102, for example, by tightening the knob on the threaded stud.

The access port 108 is circumscribed by a flange 134 and a bagging ring 136. The flange 134 extends from the face 126 of the housing 102 and circumscribes the bagging ring 136. The flange 134 is utilized to keep a bag 138, coupled to the bagging ring 136, clear of the seal 124 as the door 122 is closed.

Figure 2:
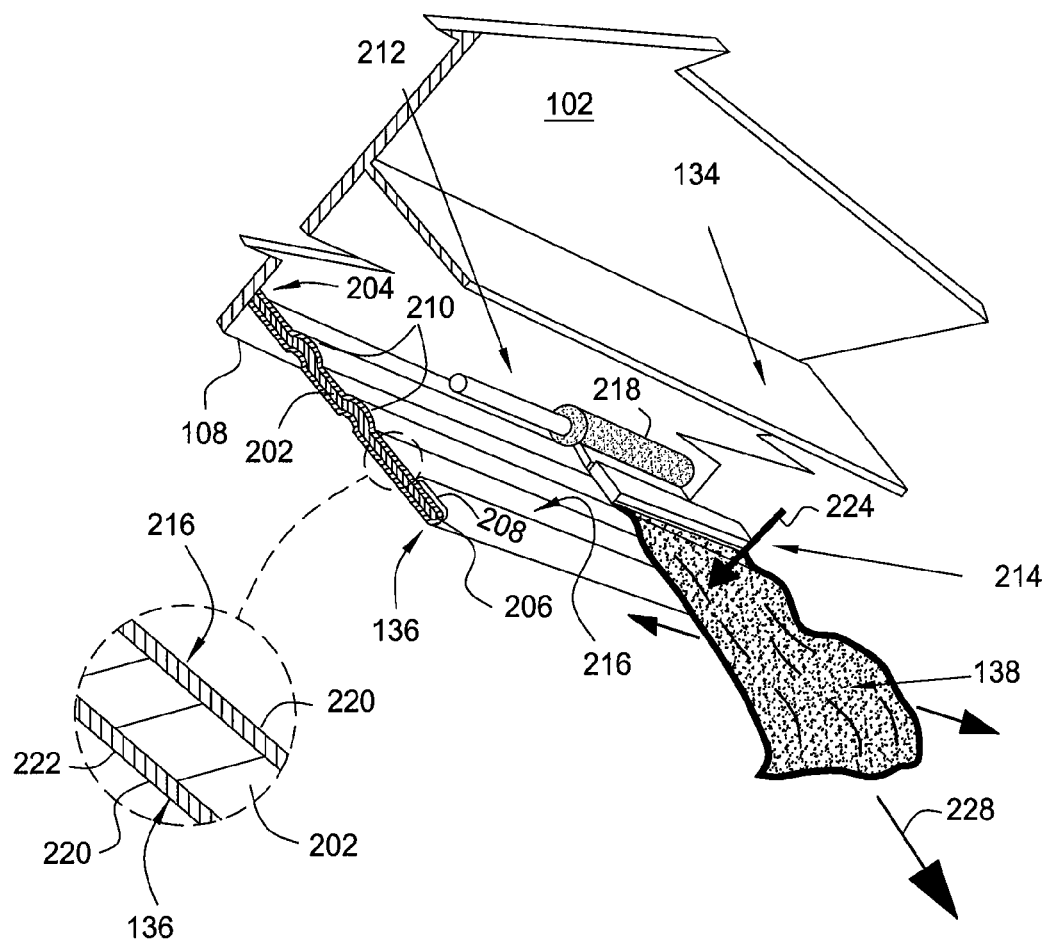
FIG. 2 is a partial sectional view of the contamination housing of FIG. 1 detailing a bagging ring to bag interface.

FIG. 2 is a partial sectional view of the housing 102 illustrating the bagging ring 136 to bag 138 interface. The bagging ring 136 is generally a member 202 having a substantially perpendicular orientation to the housing 102. The member 202 may be fabricated from a material similar to, or the same as the housing 102. A first end 204 of the member 202 is sealed to the housing 102 to prevent leakage therebetween. In one embodiment, the first end 204 is continuously welded to the housing 102. A second end 206 of the member 202 includes a fold 208 or hem to prevent damage to the bag 138.

The member 202 may additionally include a plurality of ribs 210. In one embodiment, the ribs 210 are disposed on an outside surface 216 of the member 202, and extend in the direction away from the access port 108. It is also contemplated that one or more grooves may be formed in the member 202 in addition to, or in place of, the ribs 210.

The ribs 210 facilitate coupling the bag 138 to the bagging ring 136. For example, the open end 218 of the bag 138 may include an elastic cord 212 which is stretched over the bagging ring 136 when the bag 138 is engaged with the housing assembly 100. The elastic cord 212 urges the bag 138 against the member 202 and is retained by the ribs 210 from sliding off the second end 206 of the bagging ring 136.

A band 214 may be strapped over the bag 138 and drawn tight to further secure the bag 138 to the bagging ring 136. In one embodiment, the band 214 is disposed between two ribs 210 of the ring such that the bag 138 is substantially secured to the bagging ring 136.

To provide adhesion and/or a seal between the bag 138 and bagging ring 136, at least the outside surface 216 of the member 202 is coated and/or fabricated with a material that has a property that improves the adhesion and/or provides a seal between the bag 138 and bagging ring 136. In the embodiment depicted in FIG. 2, the member 202 has a coating 220 disposed thereon that improves the adhesion properties, such as adhesion, tackiness, static attraction and the like, as compared to conventional uncoated or painted steel bagging rings. The coating 220 may optionally be applied to the inside 222 of the member 202 and/or portions of the housing 102. In one embodiment, the coating 220 is a polymer film. In another embodiment, the coating 220 is an adhesive. In another embodiment, the coating 220 is a tacky material. In yet another embodiment, the coating 220 is a material statically attractive to a polymer bag (e.g., the bag 138).

The coating 220 may be directly applied on the base metal surface of the member 202. Alternatively, the coating 220 may be applied a protective coating, such as for corrosion protection, covering the base metal surface of the member 202. It is also contemplated that the member 202 may be fabricated from a material that has a property that improves the adhesion between the bag 138 and bagging ring 136, in which case, a separate coating 220 is not required.

For comparison, six-inch wide strips of 8 mil polyvinylchloride (PVC) bag were pressed against the bagging ring 136 and a conventional painted steel ring in a normal direction to the bagging ring as shown by arrow 224 in FIG. 2. About 5 pounds of force was used to press the bag strips against each ring. The bag strip disposed against the convention bagging ring exhibited substantially no attraction to the ring, as evidenced by readily wiggling in a lateral direction and the inability to support the strip's own weight when suspended from the conventional ring. In contrast, the bag strip disposed against the bagging ring 136 (coated with a polymer material) exhibited substantial attraction to the bagging ring 136, as evidenced by no movement in a lateral direction and the ability to support the strip's weight when suspended from the conventional ring. Moreover, the bag strip remained adhered to the bagging ring 136 even when subjected to a force in excess of about 1 pound exerted in a direction parallel to the plane of the bagging ring 136 and normal to the housing 102. In this example, the coating material 220 was polyurethane. Thus, the attraction is such that a polymer bag may be supported from the bagging ring 136 without the elastic cord and band engaging the ring (e.g., the band and elastic cord removed). It is contemplated that the materials selected for the coating material 220 may be selected to obtain a desired performance when utilized with a specific bag material.

Thus, a housing assembly has been provided that improves a bag-to-bagging ring seal over conventional designs. Importantly, the attraction between the bag and bagging ring provides increased measure of safety against leakage under the band when replacing filters. Additionally, although the invention has been illustrated using a housing assembly containing a filter, it is contemplated that the improved bagging ring may be utilized in other contamination housing, for example, scan test housings coupled adjacent to a filter disposed in a ductwork, or other application where a poly bag to bagging ring seal is desirable for preventing exposure to an environment inside a housing.

Although various embodiments which incorporate the teachings of the present invention have been shown and described in detail herein, those skilled in the art can readily devise many other varied embodiment that still incorporate these teachings.

What is claimed is:

1. A housing assembly including a filter housing having an inlet, outlet, a filter access port and a bag-in/bag-out bagging ring, wherein the improvement comprises:
   a material coating the bagging ring having a physical property that enhances sealing of a polymer bag to the bagging ring, the material forming a unitary structure with the filter housing, the unitary structure operable for repeated sealing with the replacement filter change-out bags.

2. The housing assembly of claim 1, wherein the material is statically attractive to the polymer bag.

3. The housing assembly of claim 1, wherein the material is tacky.

4. The housing assembly of claim 1, wherein the material will support a hanging strip of the polymer bag when pressed thereto.

5. The housing assembly in claim 1, wherein the material will support a hanging strip of the polymer bag when pressed thereto against a pulling force of about 1 pound.

6. The housing assembly in claim 1, wherein the bagging ring further comprises:
   a member coupled at a first end to the filter housing and coated by the material on at least a side of the member facing away from the filter access port.

7. The housing assembly in claim 6, wherein the member further comprises a protective layer disposed below the material coating the member.

8. The housing assembly in claim 6, wherein the material coating the member is a polymer.

9. The housing assembly in claim 6, wherein the material coating the member is an adhesive.

10. The housing assembly in claim 1, wherein the bagging ring further comprises a protective layer disposed below the material coating the bagging ring.

11. A housing assembly, including a filter housing having an inlet, an outlet, a filter access port, and a bagging ring coupled to the filter housing and circumscribing the filter access port, wherein the improvement comprises:
    a material disposed on the bagging ring that will suspend a polymer bag strip when pressed thereto, the material forming a unitary structure with the filter housing, the unitary structure operable for repeated sealing with the replacement filter change-out bags.

12. The housing assembly of claim 11, wherein the material statically attracts plastic.

13. The housing assembly of claim 11, wherein the material is tacky.

14. The housing assembly of claim 11, wherein the material will support a hanging strip of polymer bag when pressed thereto against a pulling force of about 1 pound.

15. The housing assembly in claim 11, wherein the material covers at least a portion of the bagging ring facing away from the filter access port.

16. The housing assembly in claim 11, wherein the bagging ring further comprises:
    a base material at least partially covered by a protective layer.

17. The housing assembly in claim 11, wherein the material is a polymer.

18. A housing assembly comprising:
    a filter housing having an inlet, outlet, and access port;
    a bagging ring coupled to the filter housing and circumscribing the access port;
    a flange disposed in the filter housing;
    a linkage mechanism adapted to selectively engage a filter disposed in the filter housing with the flange; and
    a material disposed on the bagging ring having a physical property that enhances adhesion of a polymer bag to the bagging ring, the material, bagging ring and filter housing defining a unitary structure, the unitary structure operable for repeated sealing with the replacement filter change-out bags.

19. The housing assembly in claim 18, wherein the material will suspend a polymer bag strip when pressed thereto.

20. The housing assembly in claim 19, wherein the material is at least one of a polymer or an adhesive.

* * * * *